United States Patent
Cao et al.

(10) Patent No.: US 10,078,902 B1
(45) Date of Patent: Sep. 18, 2018

(54) FAST ROBUST METHOD FOR COMPENSATING EGO-TRANSLATIONS AND DETECTING INDEPENDENT MOVING OBJECTS IN VIDEO CAPTURED WITH A MOVING CAMERA

(71) Applicant: HRL Laboratories, LLC, Malibu, CA (US)

(72) Inventors: Yongqiang Cao, Newton, MA (US); Narayan Srinivasa, Hillsboro, OR (US)

(73) Assignee: HRL Laboratories, LLC, Malibu, CA (US)

( * ) Notice: Subject to any disclaimer, the term of this patent is extended or adjusted under 35 U.S.C. 154(b) by 112 days.

(21) Appl. No.: 15/250,665

(22) Filed: Aug. 29, 2016

Related U.S. Application Data

(60) Provisional application No. 62/210,630, filed on Aug. 27, 2015.

(51) Int. Cl.
    *G06T 7/20* (2017.01)
    *G06K 9/00* (2006.01)
    *B64D 47/08* (2006.01)

(52) U.S. Cl.
    CPC .............. *G06T 7/20* (2013.01); *B64D 47/08* (2013.01); *G06K 9/0063* (2013.01); *G06K 9/00711* (2013.01); *G06K 9/00771* (2013.01); *G06T 2207/10016* (2013.01); *G06T 2207/10032* (2013.01); *G06T 2207/30252* (2013.01)

(58) Field of Classification Search
    CPC .. G06T 7/20; G06T 7/254; G06T 7/70; G06T 7/97; G06K 9/00624; G06K 9/0063; G06K 9/00711; G06K 9/00771
    See application file for complete search history.

(56) References Cited

U.S. PATENT DOCUMENTS

| | | | |
|---|---|---|---|
| 7,227,893 B1* | 6/2007 | Srinivasa et al. | ........ 375/240.08 |
| 2016/0307334 A1* | 10/2016 | Dos Santos Mendonca | ............... G06T 7/2033 |
| 2017/0277197 A1* | 9/2017 | Liao et al. | ........... G05D 1/0251 |
| 2017/0309034 A1* | 10/2017 | Mueller | .................. G06T 7/248 |

OTHER PUBLICATIONS

Del-Blanco, C. R., Jaureguizar, F., Salgado, L., & García, N. (2008). Motion estimation through efficient matching of a reduced number of reliable singular points. In Electronic Imaging 2008, pp. 68110N 1-12.

Bruss, A. R., & Horn, B. K. (1983). Passive navigation. Computer Vision, Graphics, and Image Processing, 21(1), pp. 3-20.

(Continued)

*Primary Examiner* — Andrew W Johns
(74) *Attorney, Agent, or Firm* — Tope-McKay & Associates

(57) ABSTRACT

Described is a system for compensating ego-translations in video captured with a moving camera. Translative ego-motion is estimated on a sequence of image frames captured by a moving camera by minimizing a cost function that is based on at least one image frame difference between consecutive image frames. An alternating one directional search is performed to minimize the cost function to find an optimal translation. The optimal translation is applied to the sequence of image frames, resulting in a sequence of image frames with ego-translations.

21 Claims, 22 Drawing Sheets

(56) References Cited

OTHER PUBLICATIONS

Cheng, Y., Maimone, M., & Matthies, L. (2005). Visual odometry on the Mars exploration rovers. In IEEE International Conference on Systems, Man and Cybernetics, 2005, vol. 1, pp. 903-910.
Fischler, M. A., & Bolles, R. C. (1981). Random sample consensus: a paradigm for model fitting with applications to image analysis and automated cartography. Communications of the ACM, 24(6), pp. 381-395.
Horn, B. K., & Schunck, B. G. (1981). Determining optical flow. In 1981 Technical Symposium East International Society for Optics and Photonics, pp. 319-331.
Lucas, B. D., & Kanade, T. (1981). An iterative image registration technique with an application to stereo vision. In IJCAI, vol. 81, pp. 674-679.
Ren, X. (2008). Local grouping for optical flow. In IEEE Conference on Computer Vision and Pattern Recognition, 2008, CVPR'08, pp. 1-8.
Tian, T. Y., Tomasi, C., & Heeger, D. J. (1996). Comparison of approaches to egomotion computation. In IEEE Conference on Computer Vision and Pattern Recognition, 1996, CVPR'96, pp. 315-320.

\* cited by examiner

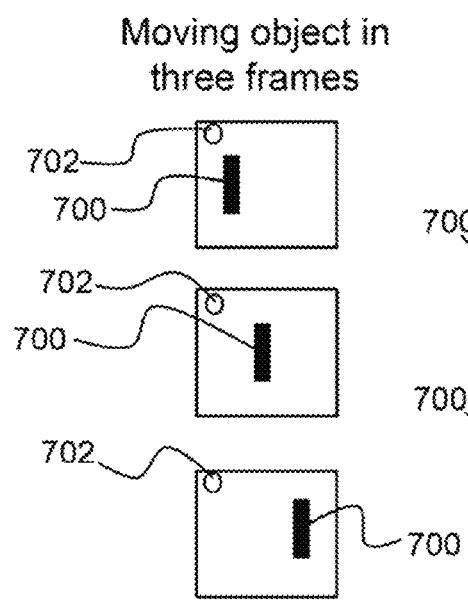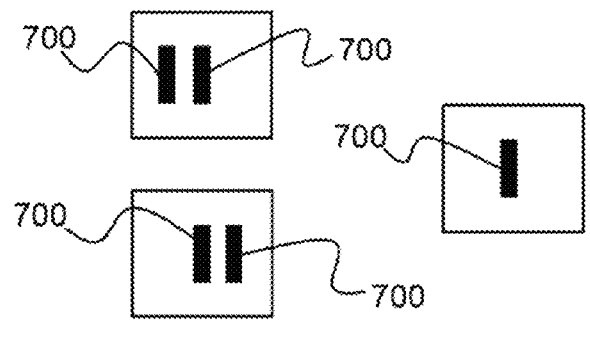
FIG. 7A  FIG. 7B  FIG. 7C

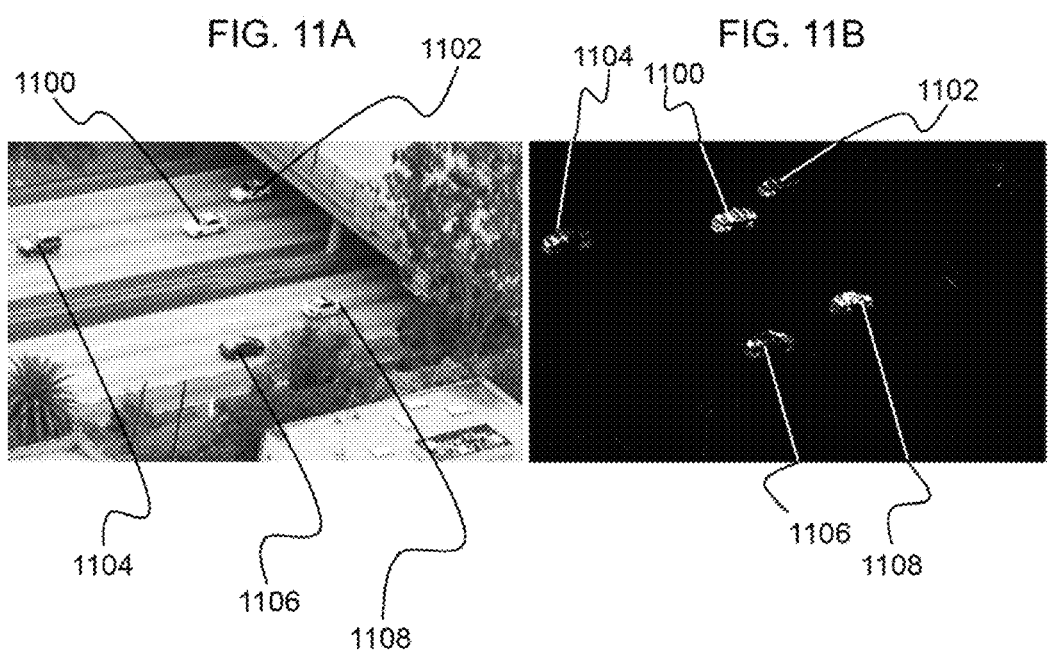

| Video<br>Start frame | Horizontal shift size<br>Vertical shift size |
|---|---|
| V5<br>F50 | 25 28 28 26 26 28 30 32 33<br>7 6 1 6 11 5 2 6 12 |
| V28<br>F6765 | 30 31 28 30 30 26 26 26 26<br>8 7 0 4 9 1 -3 1 1 |
| V25<br>F5445 | 23 23 23 23 25 25 25 25 27<br>1 3 0 -1 -1 1 0 0 -2 |
| V50<br>F340 | 9 12 13 15 21 17 23 17 32<br>6 15 14 9 9 12 15 6 4 |
| V16<br>F1256 | 17 18 19 19 16 17 17 15 17<br>10 12 12 9 10 10 10 11 11 |

FIG. 14

| Video Start frame | Number of image difference operations | Mean (F2~F9) |
|---|---|---|
| V5 F50 | 18  15  9  16  17  19  14  18 16 | 15.5 |
| V28 F6765 | 19  8  15  19  17  19  10  14 4 | 13.25 |
| V25 F5445 | 21  11  7  6  11  11  6  4 14 | 8.75 |
| V50 F340 | 18  22  15  17  14  19  17  18 25 | 18.4 |
| V16 F1256 | 9  13  6  9  11  6  4  9  11 | 8.6 |

FIG. 15

| Video Start frame | Horizontal shift size Vertical shift size | | | | | | | | |
|---|---|---|---|---|---|---|---|---|---|
| V5 F50 | 7 2 | 7 1 | 8 0 | 7 2 | 7 3 | 7 1 | 8 1 | 8 1 | 9 3 |
| V28 F6765 | 8 2 | 8 2 | 7 0 | 8 1 | 8 2 | 7 0 | 7 -1 | 7 0 | 7 0 |
| V25 F5445 | 6 0 | 6 1 | 6 0 | 6 0 | 7 0 | 7 0 | 7 0 | 7 0 | 7 0 |
| V50 F340 | 3 1 | 3 3 | 3 3 | 4 2 | 6 2 | 5 3 | 6 3 | 4 1 | 9 1 |
| V16 F1256 | 5 3 | 5 3 | 5 3 | 5 2 | 4 2 | 4 2 | 5 3 | 5 3 | 5 3 |

FIG. 16

| Video Start frame | Number of image difference operations | | | | | | | | | Mean (F2~F9) |
|---|---|---|---|---|---|---|---|---|---|---|
| V5 F50 | 13 | 11 | 10 | 13 | 9 | 14 | 9 | 4 | 17 | 10.9 |
| V28 F6765 | 15 | 4 | 9 | 10 | 9 | 9 | 5 | 9 | 4 | 7.4 |
| V25 F5445 | 13 | 9 | 5 | 4 | 9 | 4 | 4 | 4 | 4 | 5.4 |
| V50 F340 | 12 | 13 | 4 | 10 | 12 | 18 | 9 | 12 | 15 | 11.6 |
| V16 F1256 | 4 | 4 | 4 | 5 | 5 | 4 | 10 | 4 | 4 | 5 |

FIG. 17

FAST ROBUST METHOD FOR COMPENSATING EGO-TRANSLATIONS AND DETECTING INDEPENDENT MOVING OBJECTS IN VIDEO CAPTURED WITH A MOVING CAMERA

GOVERNMENT LICENSE RIGHTS

This invention was made with government support under U.S. Government Contract Number HR0011-13-C-0052. The government has certain rights in the invention.

CROSS-REFERENCE TO RELATED APPLICATIONS

This is a Non-Provisional patent application of 62/210,630, filed in the United States on Aug. 27, 2015, entitled, "A Fast and Robust Method for Compensating Ego-Translations and Detecting Independent Moving Objects in Video Captured with a Moving Camera," the entirety of which is hereby incorporated by reference.

BACKGROUND OF INVENTION

(1) Field of Invention

The present invention relates to a system for estimating ego-translations in video captured with a moving camera and, more particularly, to a system for estimating ego-translations in video captured with a moving camera that allows for detection of independent moving objects in a video scene.

(2) Description of Related Art

Prevalent methods of estimating the ego-motion of a camera require feature detection and optical flow, where features are detected in the first frame, and then matched in the second frame (see the List of Incorporated Literature References, Literature Reference Nos. 1, 3, and 8). The matched features are then used to compute the optical flow field for providing an estimate of the camera motion (see Literature Reference Nos. 2, 5, 6, and 7). Although these methods can serve for general purpose where a camera is freely moving and rotating, they are highly computation-intensive. Furthermore, these methods will not work well when there are independent moving objects in the scene. In order to reduce the effect of independent moving objects, some random sampling method (e.g., RANSAC) has to be used to remove these moving outliers. This further increases the computation cost.

Thus, a continuing need exists for a system that performs the task of moving object detection within live motion footage at a minimal computational cost.

SUMMARY OF INVENTION

The present invention relates to a system for estimating ego-translations in video captured with a moving camera and, more particularly, to a system for estimating ego-translations in video captured with a moving camera that allows for detection of independent moving objects in a video scene. The system comprises a video camera, wherein the video camera comprises one or more processors and a memory having instructions such that when the instructions are executed, the one or more processors perform multiple operations. The system estimates translative ego-motion on a sequence of image frames captured by a moving camera by minimizing a cost function that is based on at least one image frame difference, wherein I and I' represent consecutive image frames in the sequence of image frames, and wherein h and v represent shift translations, wherein an optimal translation (h, v) to compensate camera ego-motion is determined according to the following:

$$\min_{h,v} \sum_{i,j} |I'(i+h, j+v) - I(i, j)|,$$

where i and j represent coordinates of a position in an image frame.

An alternating one directional search is performed to minimize the cost function to find the optimal translation. The optimal translation is applied to the sequence of image frames, resulting in a sequence of image frames with ego-translations.

In another aspect, a search for the optimal translation is initiated from an initial point. The search proceeds as far as possible in one of a horizontal or a vertical direction until reaching a point representing a local minimum for that direction. Starting at the point representing the local minimum, the system searches as far as possible in the other of the horizontal or vertical direction. The search continues in alternating horizontal and vertical directions until a global minimum is reached, wherein the optimal translation is the global minimum.

In another aspect, $(h_0, v_0)$ is the initial point, and the system performs the following operations:

(a) finding $h_1$ such that $$\min_h f(h, v_0) \text{ at } h = h_1;$$

(b) finding $v_1$ such that $$\min_v f(h_1, v) \text{ at } v = v_1;$$

(c) let $\Delta h = |h_1 - h_0|$, $\Delta v = |v_1 - v_0|$, then resetting $h_0 := h_1$ and $v_0 := v_1$, where $:=$ denotes "is defined as";

(d) repeating operations (a)-(c) until $\Delta h$ and $\Delta v$ are zeros (or small enough).

In another aspect, independent moving objects are detected in the sequence of image frames with ego-translations.

In another aspect, the independent moving objects are detected by multiplying two consecutive image frame differences d1 and d2, wherein I1, I2, I3 are three consecutive image frames in the sequence of image frames, and (h1, v1) and (h2, v2) are corresponding optimal translations to compensate the camera ego-motion, wherein $$d1(i,j) = |I1(i,j) - I2(i+h1, j+v1)| \text{ and}$$

$$d2(i,j) = |I2(i,j) - I3(i+h2, j+v2)|,$$

wherein pixels for independent-moving objects are determined according to the following:

$$m(i,j)=d1(i,j)d2(i+h1,j+v1),$$

where m is an image map of detected object pixels, and (i,j) is a position in the image map.

In another aspect, independent moving objects are detected by multiplying image frame differences from non-adjacent image frames.

In another aspect, the optimal translation found in a current image frame is used as the initial point for a next image frame in the sequence of image frames to increase a search speed in finding the optimal translation in the next image frame.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 7A is an illustration of an independent-moving object and a stationary background object in three frames with camera ego-motion compensated according to various embodiments of the present disclosure;

FIG. 7B is an illustration of an absolute frame according to various embodiments of the present disclosure;

FIG. 7C is an illustration of a product of the two frame differences according to various embodiments of the present disclosure;

FIG. 11A is a sample frame from a video sequence according to various embodiments of the present disclosure;

FIG. 11B is an illustration of a final detection in the sample frame according to various embodiments of the present disclosure;

FIG. 14 is a table illustrating estimated optimal translation on an original image of size 1080×1920 in pixels according to various embodiments of the present disclosure;

FIG. 15 is a table illustrating a number of frame-difference operations taken to reach the global minimum for the original image of size 1080×1920 according to various embodiments of the present disclosure;

FIG. 16 is a table illustrating estimated optimal translation on a scaled image of size 256×512 according to various embodiments of the present disclosure;

FIG. 17 is a table illustrating a number of frame-difference operations taken to reach the global minimum for the scaled image of size 256×512 according to various embodiments of the present disclosure;

DETAILED DESCRIPTION

Figure 1:
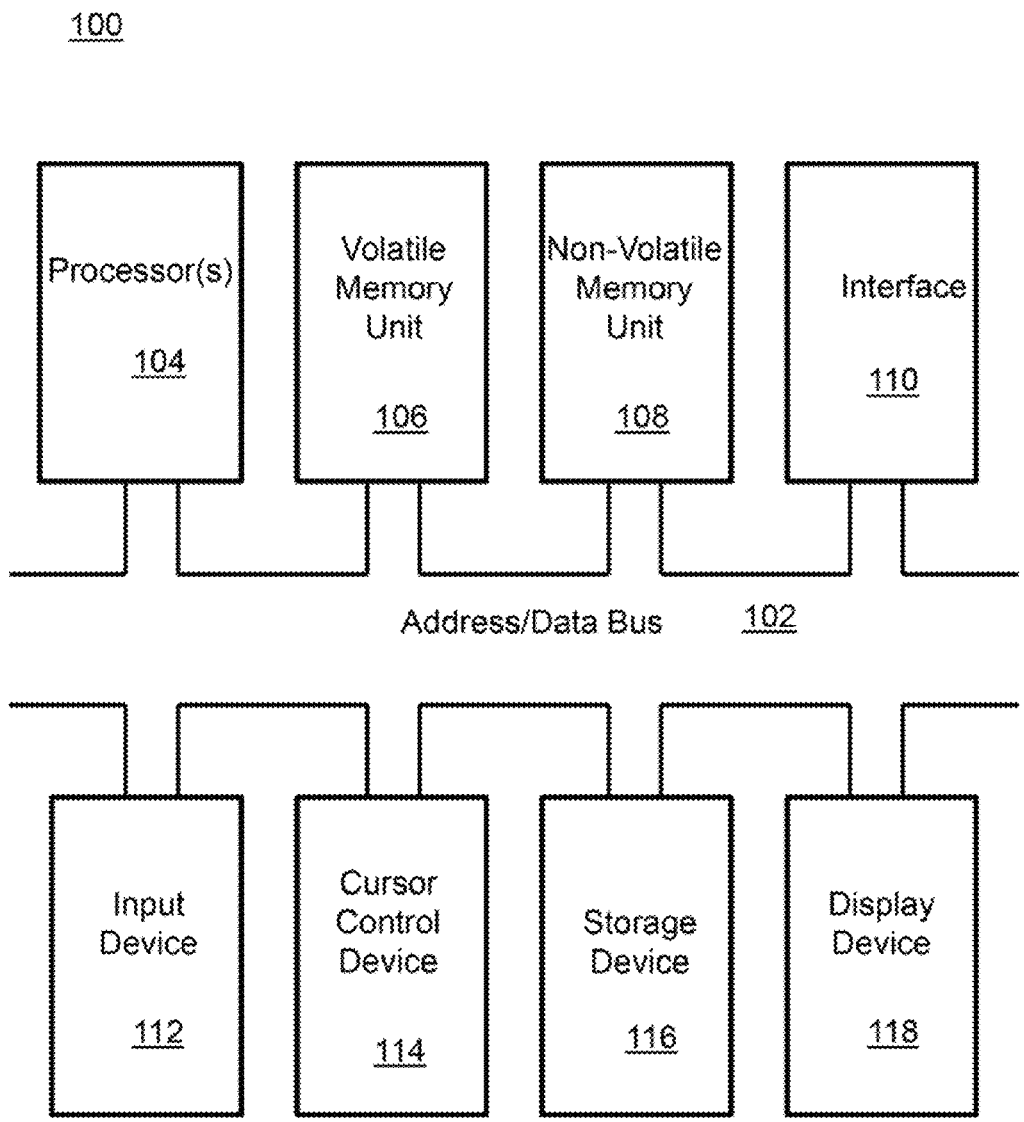
FIG. 1 is a block diagram depicting the components of a system according to various embodiments of the present disclosure.

The present invention relates to a system for estimating ego-translations in video captured with a moving camera and, more particularly, to a system for estimating ego-translations in video captured with a moving camera that allows for detection of independent moving objects in a video scene.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Cited Literature References

The following references are cited throughout this application. For clarity and convenience, the references are listed herein as a central resource for the reader. The following references are hereby incorporated by reference as though fully set forth herein. The references are cited in the application by referring to the corresponding literature reference number.

1. del-Blanco, C. R., Jaureguizar, F., Salgado, L., & Garcia, N. (2008). Motion estimation through efficient matching of a reduced number of reliable singular points. In *Electronic Imaging* 2008 (pp. 68110N 1-12).
2. Bruss, A. R., & Horn, B. K. (1983). Passive navigation. *Computer Vision, Graphics, and Image Processing*, 21(1), 3-20.
3. Cheng, Y., Maimone, M., & Matthies, L. (2005). Visual odometry on the Mars exploration rovers. In *IEEE International Conference on Systems, Man and Cybernetics*, 2005 (Vol. 1, pp. 903-910).
4. Fischler, M. A., & Bolles, R. C. (1981). Random sample consensus: a paradigm for model fitting with applications to image analysis and automated cartography. Communications of the ACM, 24(6), 381-395.
5. Horn, B. K., & Schunck, B. G. (1981). Determining optical flow. In 1981 *Technical Symposium East* International Society for Optics and Photonics. (pp. 319-331).
6. Lucas, B. D., & Kanade, T. (1981). An iterative image registration technique with an application to stereo vision. In *IJCAI* (Vol. 81, pp. 674-679).
7. Ren, X. (2008). Local grouping for optical flow. In *IEEE Conference on Computer Vision and Pattern Recognition*, 2008 (CVPR '08, pp. 1-8).
8. Tian, T. Y., Tomasi, C., & Heeger, D. J. (1996). Comparison of approaches to egomotion computation. In *IEEE Conference on Computer Vision and Pattern Recognition*, 1996 (CVPR '96, pp. 315-320).

(2) Principal Aspects

Various embodiments of the invention include three "principal" aspects. The first is a system for estimating ego-translations in video captured with a moving camera. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
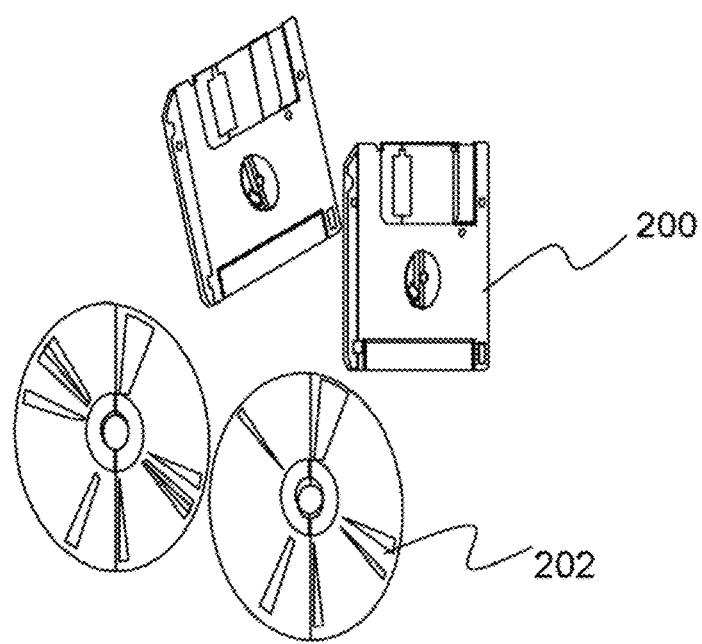
FIG. 2 is an illustration of a computer program product embodying an aspect of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Described is a fast and robust method to estimate ego-translations in a video taken with a moving camera. Based on the estimated ego-translations, a unique method to find independent moving objects in the video footage was developed. The task of finding independent moving objects in the footage obtained by a moving camera video is highly challenging, since everything, including the background, is moving in the captured images of the video. The method according to embodiments of the present disclosure is fast and efficient, taking only 8 frame-difference operations, on average, to find the correct ego-translation. As a result, it is highly amenable to be implemented in hardware enabling ultra-low power consumption.

As will be described in further detail below, the present invention finds the ego-translation by minimizing a cost function that is based on the difference between consecutive image frames. As a result, no expensive feature matching or optical flow computations are needed. The method is so fast and efficient that normally it takes no more than two search steps to reach the global minimum. Experimental simulations performed show that the method of the present invention is robust to noise as well as a small degree of scaling and rotation, as will be described in further detail below.

(3.1) Method to Find Ego-Translation in Two Video Frames

Let I and I' be two consecutive frames in a video with ego-translations. In the ideal case, there are shift translations h and v such that $I'(i+h, j+v)=I(i, j)$ for any position $(i,j)$. However, in practice, this rarely occurs, owing to independent object movement, three-dimensional (3D) projection, and noise for instance. Instead, the optimal translation (h, v) is found by minimizing the function:

$$f(h,v)=\Sigma_{ij}|I'(i+h,j+v)-I(i,j)|. \quad (1)$$

In other words, $$\min_{h,v}\sum_{ij}|I'(i+h,j+v)-I(i,j)|. \quad (2)$$

Figure 3A:
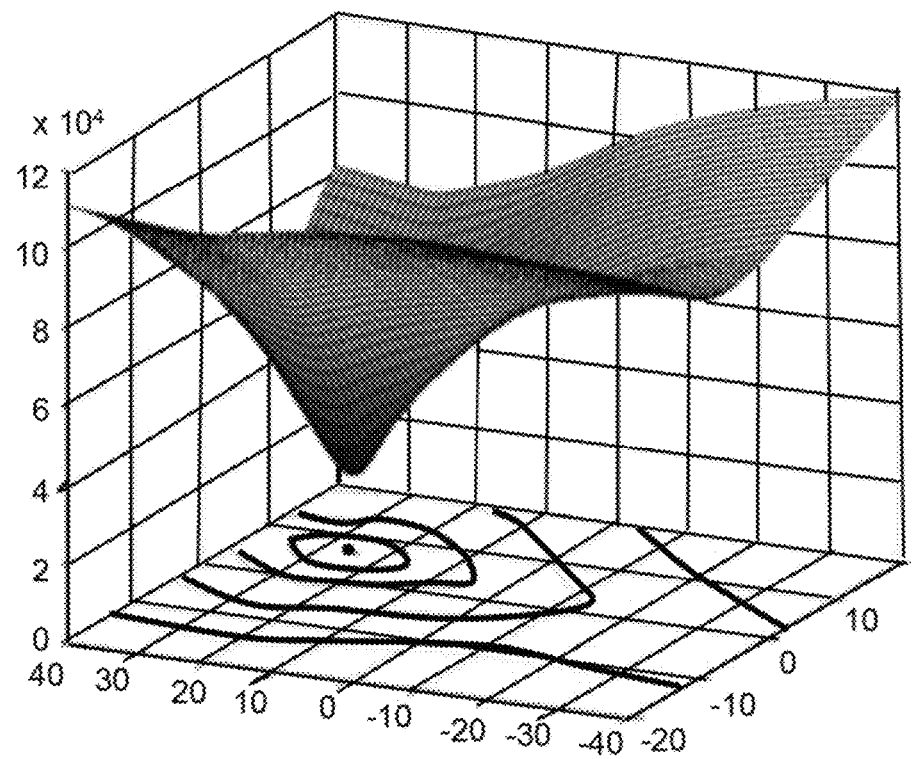
FIG. 3A is an illustration of a convex cost function on a helicopter dataset with a global minimum according to various embodiments of the present disclosure.
Figure 3B:
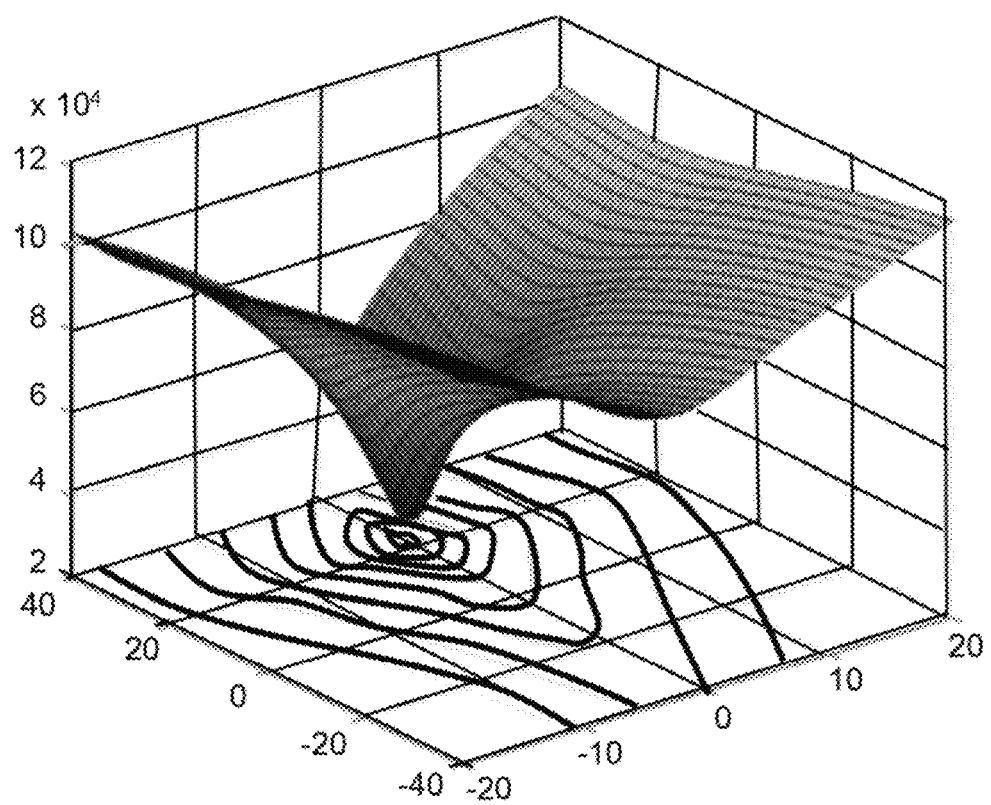
FIG. 3B is an illustration of another convex cost function on the helicopter dataset with a global minimum according to various embodiments of the present disclosure.
Figure 3C:
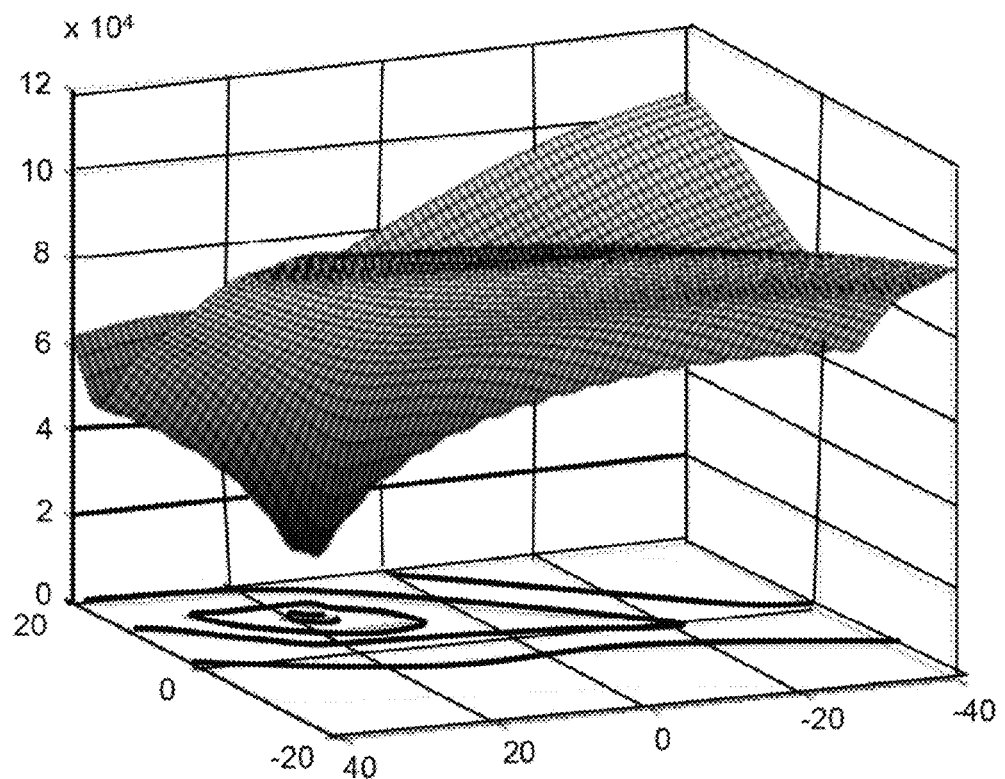
FIG. 3C is an illustration of a quasi-convex cost function on the helicopter dataset with a deep global minimum and many shallow local minima according to various embodiments of the present disclosure.

Fortunately, the function $f(h, v)$ is usually a convex function with a global minimum or, in worse cases, a quasi-convex function with a deep global minimum and some shallow local minima. FIGS. 3A-3C depict examples of sample cost convex functions $f(h, v)$ on the Defense Advanced Research Projects Agency (DARPA) Neovision 2 helicopter dataset, where units for the x and y axes are image pixels. FIG. 3A illustrates an example of a convex function with a global minimum computed from video sequence 005, frames 50 and 51 of the DARPA helicopter dataset. FIG. 3B is another example of a convex function with a global minimum computed from video sequence 025, frames 5446 and 5447 of the DARPA helicopter dataset. FIG. 3C depicts a quasi-convex function with a deep global minimum and many shallow local minima computed from video sequence 016, frames 1256 and 1257 of the DARPA helicopter dataset.

Figure 4:
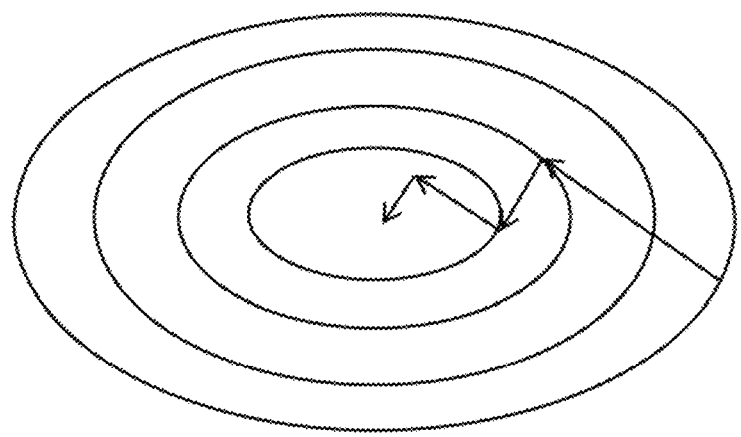
FIG. 4 is an illustration of a zigzag problem for a gradient descent method according to prior art.

While a gradient descent method can be used here to find the minimum of a convex function, it is susceptible to a zig-zagging problem during search thus requiring many steps to reach the minimum, as shown in FIG. 4. To address this, a more efficient and faster method to find the minimum of function $f(h, v)$ was developed. By means of this method, on average, it takes no more than three steps to find the global minimum from an arbitrary initial point.

(3.2) Optimization Algorithm

Figure 5:
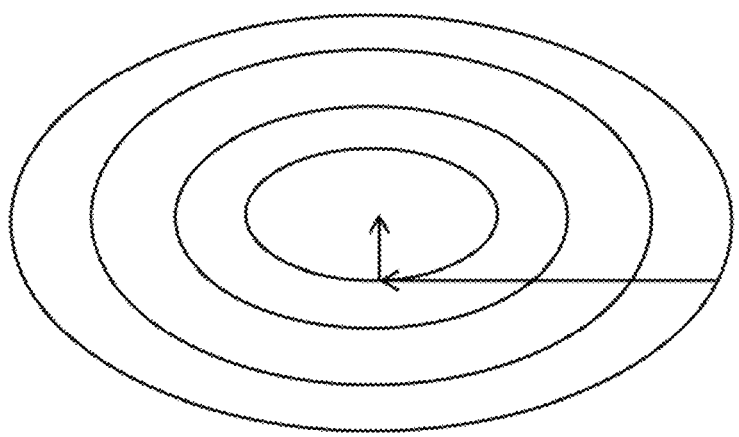
FIG. 5 is an illustration of an optimization method for minimizing function $f(h, v)$ according to various embodiments of the present disclosure.

The optimization algorithm according to embodiments of the present disclosure consists of alternative one directional searches (horizontal or vertical). Starting from an initial point, the search goes as far as possible in the horizontal (or vertical) direction until reaching the minimum in that direction. Then, starting from there, it goes as far as possible in the other direction until reaching a local minimum. Horizontal refers to the x-axis, and vertical is the y-axis. A directional search of a function with multiple variables is an optimization process of the function along only one variable or direction. It decomposes multiple variable function optimization processes into a serial of one variable function optimization processes. The process can be repeated until a global minimum is reached. For example, for an elliptic paraboloid, it takes only two steps to reach the global minimum starting from any initial point. FIG. 5 illustrates the contour plot of an elliptic paraboloid.

The search is an optimization process for a local minimum of the cost function in the search direction. The search is for the optimal shift. The method according to embodiments of the present disclosure compares two consecutive video frames by shifting one frame a certain amount in (x,y) coordinates, and then takes the difference of the two frames as the cost function). For example, if the image frames matched perfectly, the difference should be zero. The initial point is an initial shift, which is used as an initial point and, from there, the algorithm iteratively find the optimal shift.

Mathematically, let $(h_0, v_0)$ be the initial point. The algorithm then proceeds as follows.

1. Find $h_1$ such that $$\min_{h}$$

$f(h,v_0)$ at $h=h_1$;

2. Find $v_1$ such that $$\min_{v}$$

$f(h_1,v)$ at $v=v_1$.

3. Let $\Delta h=|h_1-h_0|$, $\Delta v=|v_v-v_0|$, then reset $h_0:=h_1$ and $v_0:=v1$, where:=denotes "is defined as".
4. Repeat steps 1-3 until $\Delta h$ and $\Delta v$ are zeros or a predetermined small value. For instance, depends on the image resolution, the value can be one or two pixels.

By performing simulations on the DARPA helicopter videos, it was determined that, on average, it takes no more than three directional search steps to reach the global minimum. Below is a description of the directional search method used in the above algorithm (Steps 1 and 2).

(3.3) Directional Search Algorithm

A horizontal directional search is used as a non-limiting example of the directional search algorithm according to embodiments of the present disclosure. Vertical directional search is similar. Let $g(h)=f(h+h_0, v_0)$, where $(h_0, v_0)$ is the initial position.

1. Determine the search direction side (left or right). This can be done by choosing the smallest among $g(\Delta h)$, $g(-\Delta h)$ and $g(0)$, with $\Delta h$ being a small number (e.g., 1 or 2). Let h<0 denote left and h>0 denote right. If $g(0)$ is the smallest, then stop and return h=0. Otherwise, let $d(h)$ be $g(h)$ (if $g(\Delta h)$ is the smallest) or $g(-h)$ (if $g(-\Delta h)$ is the smallest).
2. Initialize L, B and H such that $d(B) \leq d(L)$ and $d(B) \leq d(H)$. This can be done as follows. Let L=0, $\delta=\Delta h$, and H=2B. Repeat the following step until $d(B) \leq d(H)$:
   2.1. Reset B:=H and H:=2B
3. If H−L>2, then repeat:
   3.1 Let $$L' = \left\lfloor \frac{L+B}{2} \right\rfloor, H' = \left\lfloor \frac{H+B}{2} \right\rfloor.$$

Here, $\lfloor \cdot \rfloor$ is the floor function.
   3.2 If $d(L')<d(B)$, then reset H:=B, and B:=L'.
   3.3 if $d(H')<d(B)$, then reset L:=B, and B:=H'.
   3.4 Otherwise, reset L:=L', and H:=H'.
4. Return h=B as the optimal directional search result.

Figure 6:
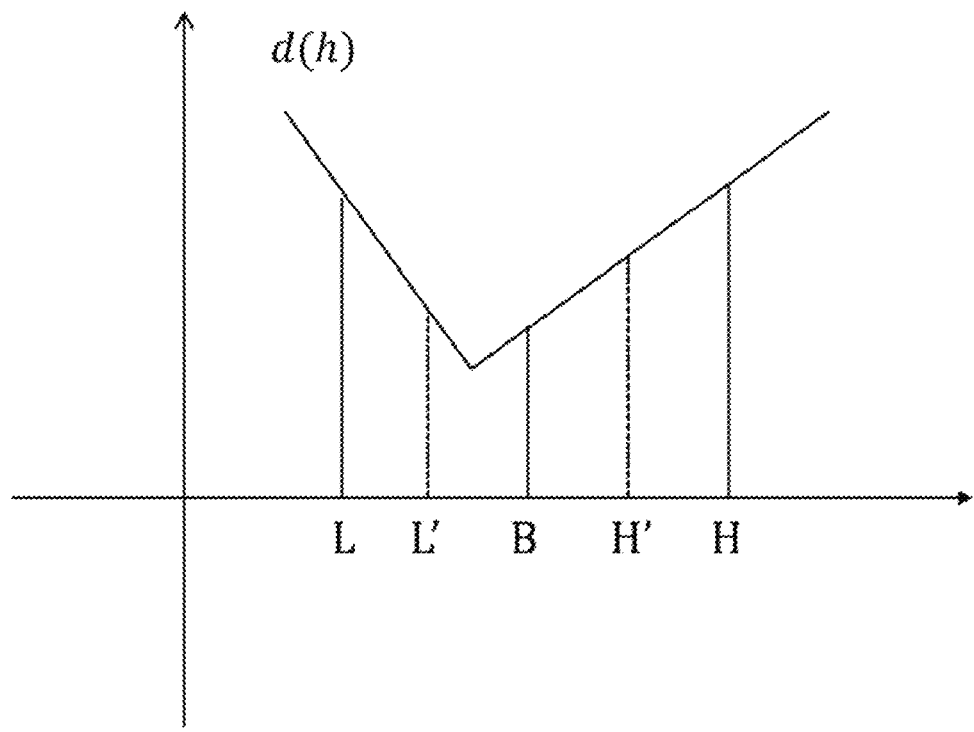
FIG. 6 is an illustration of a directional search algorithm according to various embodiments of the present disclosure.

FIG. 6 is an illustration of a directional search algorithm, where d(h) is an example one variable function. [L, H] is a searching interval, with B the current best solution. As defined in the algorithm, L' and H' are the middle points of [L, B] and [B, H].

The method according to embodiments of the present disclosure is a fast and robust approximation method to estimate translative ego-motion on videos with limited rotation and three-dimensional (3D) projection. The simulations of the DARPA Helicopter dataset show that the method has very good performance, as will be described in further detail below. What remains to be explained is how to find independent moving objects on videos with ego-translations.

(3.4) Finding Independent Moving Objects on Videos with Ego-Motion

Ideally, after getting the right estimate of camera ego-motion, the self-moving objects on the scene can be found by simply transforming frames and then computing their difference. However, due to noise, rotation, 3D projection, and other distracting phenomena and artifacts, there may be some limited background features left after the frame transform and difference operations. To address this, further multiplication is performed by two consecutive differences, which can suppress or eliminate most of the remaining background features and leave only the self-moving objects. In particular, let I1, I2, I3 be three consecutive frames in a video, and (h1, v1) and (h2, v2) be corresponding optimal translations to compensate the camera ego-motion. Define $$d1(i,j)=|I1(i,j)-I2(i+h1,j+v1)| \qquad (3)$$

$$d2(i,j)=|I2(i,j)-I3(i+h2,j+v2)|. \qquad (4)$$

Figure 19:
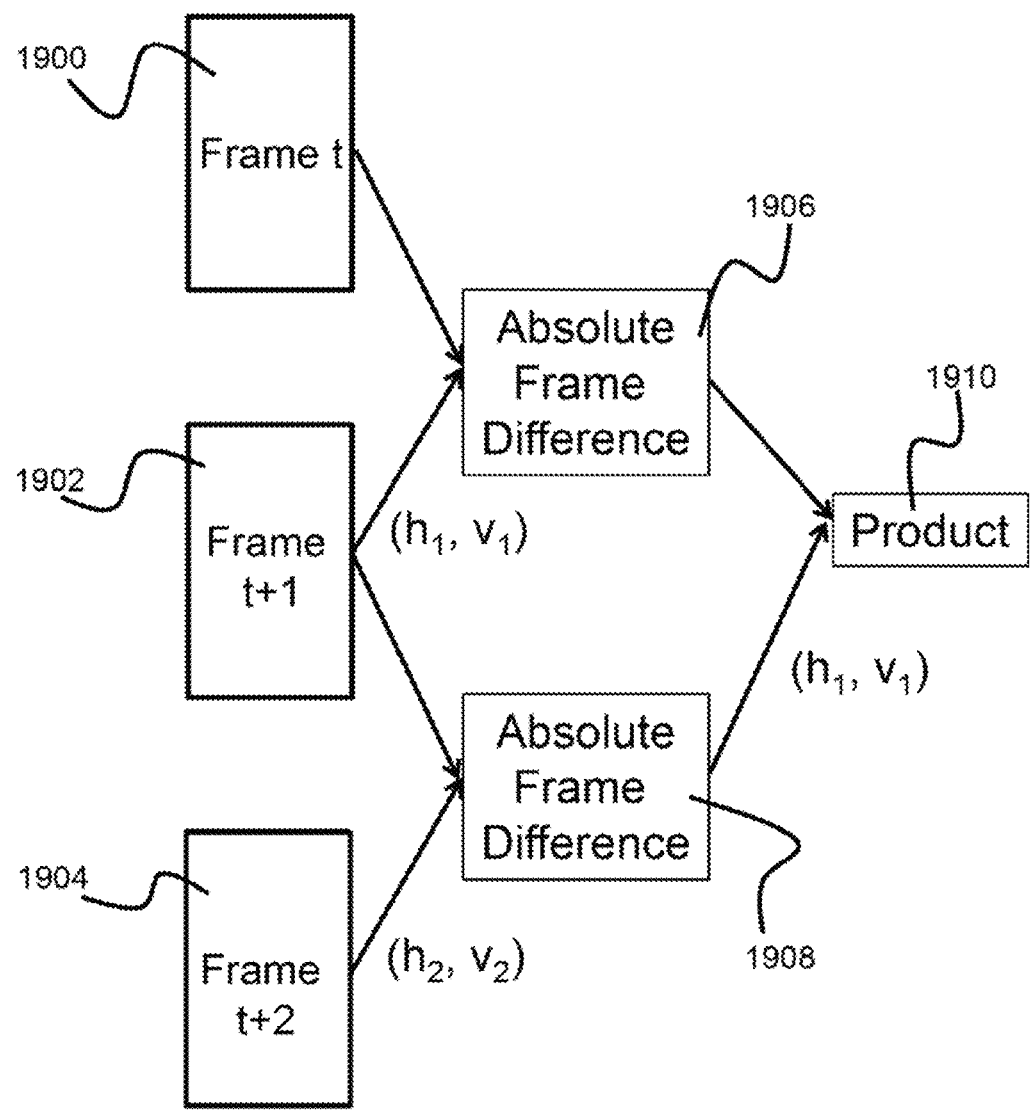
FIG. 19 is an illustration of accumulation of frame differences to generate a map of detected object pixels according to various embodiments of the present disclosure.

Then, pixels for independent-moving objects can be obtained by $$m(i,j)=d1(i,j)d2(i+h1,j+v1), \qquad (5)$$

where m is the final map of detected object pixels, and (i,j) is a position in the image map. After a pixel is detected to be part of an object, they can be grouped together to form the object body. FIG. 19 illustrates how frame differences are accumulated according to embodiments of the present disclosure. Absolute frame differences 1900 and 1902 are found between consecutive image frames t 1904 and frame t+1 1906, and frame t+1 1906 and frame t+2 1908. The multiplication of the absolute differences 1900 and 1902 results in the product 1910 of the two frame-differences provides the final map of detected object pixels.

This approach can hold because the random background features that remain after two consecutive differences usually do not coincide in position, while the independent-moving objects do. FIGS. 7A-7C provide an explanation of how this occurs. In FIG. 7A, an independent-moving object (represented by a black bar 700) and a stationary background object (represented by a circle "o" 702) are shown in three consecutive frames, where camera ego-motion is already compensated. Hence, it appears that the black bar 700 is moving to the right. In FIG. 7B, the two plots show the absolute values of consecutive frame differences. Not only do these give the moving object pixels, they do so in double positions. In FIG. 7C, the product of the two frame-differences gives the moving bar 700 in the exact position.

Figure 8A:
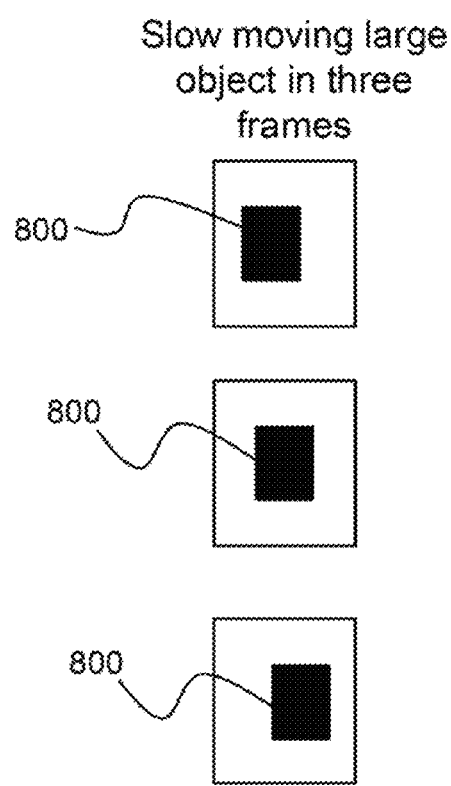
FIG. 8A is an illustration of a slow-moving large uniform object in three frames with camera ego-motion compensated according to various embodiments of the present disclosure.
Figure 8B:
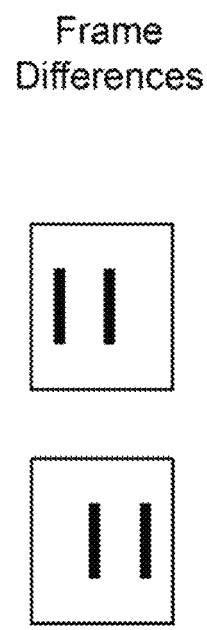
FIG. 8B is an illustration of absolute frame differences according to various embodiments of the present disclosure.
Figure 8C:
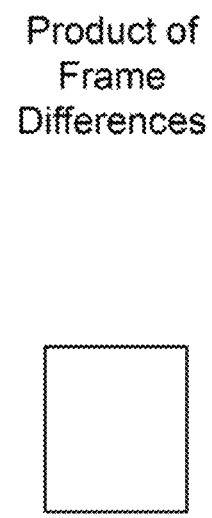
FIG. 8C is an illustration of a product of frame differences according to various embodiments of the present disclosure.
Figure 9A:
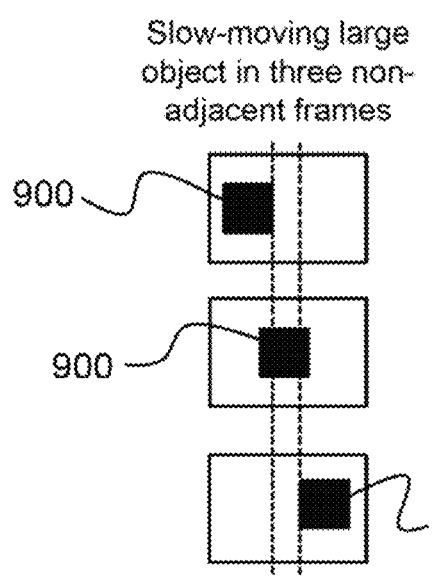
FIG. 9A is an illustration of a slow-moving large uniform object in three non-adjacent farther frames with camera ego-motion compensated according to various embodiments of the present disclosure.
Figure 9B:
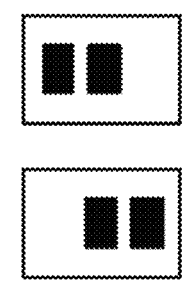
FIG. 9B is an illustration of absolute frame differences according to various embodiments of the present disclosure.
Figure 9C:
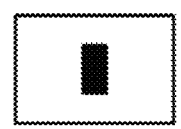
FIG. 9C is an illustration of a product of frame differences according to various embodiments of the present disclosure.

This approach works well for detecting small moving objects. As a result, the approach also works well for detecting small textures (i.e., anything that has a contrast with its surroundings) in a large moving object, as well as detecting the large object itself. Since most real objects have small textures, the approach can work well in real videos. As depicted in FIGS. 8A-8C, it is theoretically possible that the approach described herein does not work well for detecting slow-moving large and uniform objects. FIG. 8A depicts a slow-moving large uniform object (black region 800) in three frames (camera ego-motion compensated already). FIG. 8B illustrates absolute frame differences, giving partial boundaries of the moving object. FIG. 8C depicts a product of frame differences giving nothing (i.e., zeros everywhere in the image map), because the partial boundaries do not coincide. However, this problem can be solved by considering non-adjacent frames in the sequence of the video. The solution is, therefore, akin to increasing the speed of the moving object. FIGS. 9A-9C provide an illustrative explanation. FIG. 9A illustrates a slow-moving large uniform object (black region 900) in three non-adjacent farther frames (camera ego-motion compensated already). FIG. 9B depicts absolute frame difference, giving partial bodies of the moving object. FIG. 9C illustrates the product of frame differences, giving the middle part of the object (i.e., the part between the dashed vertical lines in FIG. 9A).

Figure 20:
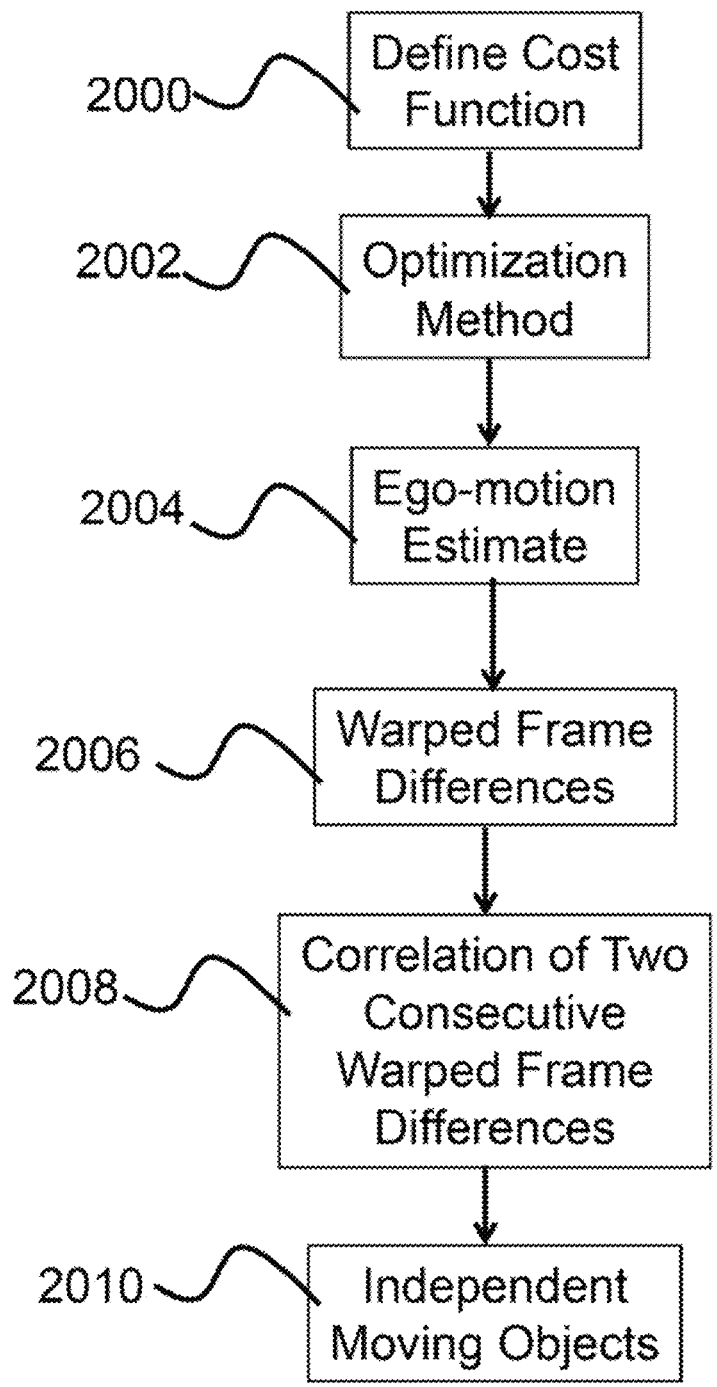
FIG. 20 is a flow diagram illustrating the approach to find independent moving objects from video captured using a moving camera according to various embodiments of the present disclosure.

FIG. 20 is a flow diagram illustrating the approach to find independent moving objects from video captured using a moving camera. As described above, in a first operation 2000, a global cost function $f(h, v)$ is defined as a sum over all valid pixels of the warped differences of two consecutive frames. The parameters of the warp (or translation) are variables. An optimization method 2002 is used to find the global minimum of the cost function. In one embodiment, an alternate line search method is used. The global minimum found is then used as the estimate of camera ego-motion (i.e., ego-motion estimate 2004). A warped frame-difference 2006 can be obtained after compensating the camera ego-motion. By using three consecutive frames one can get two warped frame-differences. Then, a correlation image between the two warped frame-differences 2008 can be obtained by pixel-wised product or a minimum, as described above. Independent moving objects 2010 can then be detected from the correlation image (element 2008), since the background pixels rarely appear (or are much weaker in intensity) on the correlation image.

(3.5) Method to Further Speed-Up the Search

The optimal translation (h, v), which represent coordinates in image pixels, found in the current frame can be used as the initial point for the next frame. This can, hence, speed up the optimal translation search for the next frame. The experimental simulations performed and described below show that by doing so, it then normally takes no more than two directional search steps to reach the global minimum.

(3.6) Method to Deal with Quasi-Convex Function with Local Minima

In some rare cases (such as that depicted in FIG. 3C), the method according to embodiments of the present disclosure can reach a local minimum when the optimization function $f(h, v)$ is quasi-convex. Note that the global minimum is deep and local minima are normally shallow (see FIG. 3C). A solution to this difficulty is choosing a good initial point $(h_0, v_0)$. In particular, in the case of helicopter footage, the initial point can be estimated according to the moving speed of the helicopter. Otherwise, if there is no camera motion speed information available, then several random initial points $(h_0, v_0)$ have to be compared first, at which time the one that has the smallest value of $f(h_0, v_0)$ must be chosen.

As described above, once the optimal translation has been estimated for the first frame, it can be used as the initial point for next frame. Therefore, the initial point only needs to be estimated once at the first frame. For a whole video of many frames, this will only add negligible computational cost. In particular, the quasi-convex function case shown in FIG. 3C can be addressed well by choosing a good initial point.

(3.7) Experimental Studies

The method described herein was tested on a DARPA helicopter dataset. Not all videos within this dataset, it must be noted, have independent moving objects. More than 20 video sequences with independent moving objects were tested. The performance displayed goes well beyond all reasonable expectations.

Figure 10A:
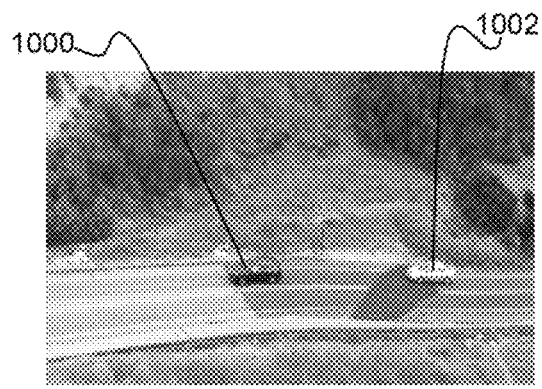
FIG. 10A is a sample frame from a video sequence according to various embodiments of the present disclosure.
Figure 10B:
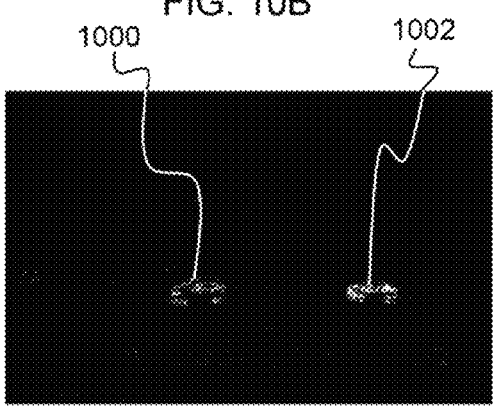
FIG. 10B is an illustration of two moving cars detected in the sample frame of FIG. 10A according to various embodiments of the present disclosure.
Figure 10C:
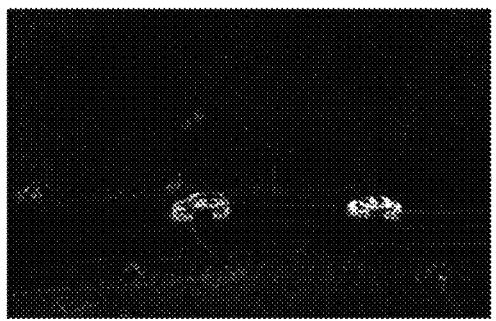
FIG. 10C is an illustration of an intermediate result of consecutive frame-differences after compensating the ego-translations that were estimated for the sample frame according to various embodiments of the present disclosure.
Figure 10D:
FIG. 10D is an illustration of an intermediate result of consecutive frame-differences after compensating the ego-translations that were estimated for the sample frame according to various embodiments of the present disclosure.
Figure 12A:
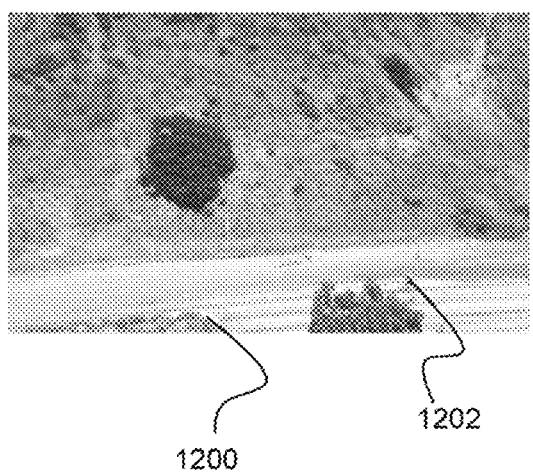
FIG. 12A is a sample frame from a video sequence according to various embodiments of the present disclosure.
Figure 12B:
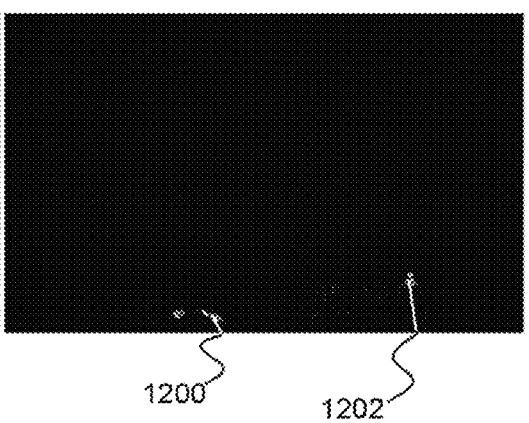
FIG. 12B is an illustration of a final detection in the sample frame according to various embodiments of the present disclosure.
Figure 13A:
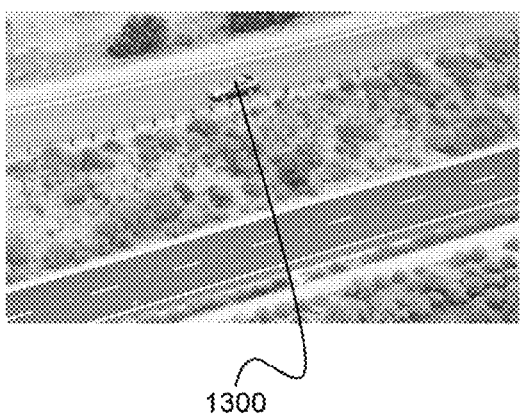
FIG. 13A is a sample frame from a video sequence according to various embodiments of the present disclosure.
Figure 13B:
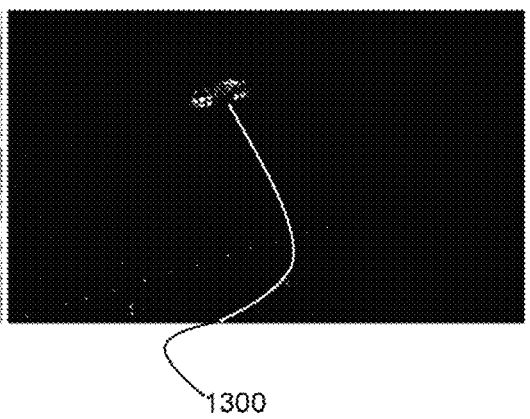
FIG. 13B is an illustration of a final detection in the sample frame according to various embodiments of the present disclosure.

FIGS. 10A-13B show the simulation results. FIG. 10A shows a sample frame in video sequence 025. FIG. 10B shows the final detection result. It can be seen that the two moving cars 1000 and 1002 are detected. FIGS. 10C and 10D show the intermediate results of consecutive frame-differences after compensating for the estimated ego translation. FIGS. 11A-13B show more video frames and the detection results. In FIGS. 11A and 11B, all five cars (1100, 1102, 1104, 1106, and 1108) in the highway are detected. In FIGS. 12A and 12B, the moving white car 1200 and cyclist 1202 are detected, even though the white car 1200 is partially occluded. In FIGS. 13A and 13B, though its cost function $f(h, v)$ is a quasi-convex as shown in FIG. 3C, the algorithm according to embodiments of the present disclosure is able to reach the global minimum by selecting a good initial point. Subsequently, all following frames reach their global minimum by using the estimate from the preceding frame as the initial point. As a result, the moving car 1300 in FIG. 13A is correctly detected, as shown in FIG. 13B.

The table in FIG. 14 shows the estimated optimal translations on original images of size 1080×1920 in helicopter videos. The first column is the video sequence number and starting frame number. For each video, 9 frames are estimated. The second column shows the estimated translations for the 9 frames in each video, where in each row, the upper number is the horizontal translation size and the lower number is the vertical translation size.

FIG. 15 is a table illustrating the number of frame-difference operations that are taken to reach the global minimum for the 9 frames in each video. The third column shows the mean number without the initial frame. On average, it takes only around ten frame-difference operations to reach the global minimum for the original videos with a resolution of 1080×1920. Note that each directional search can take several frame-difference operations. Therefore, the number of frame-difference operations is a more precise measure of computational cost. The computational cost can be further reduced when the image size is scaled down.

FIG. 16 is a table depicting the estimated optimal translation on a scaled resolution of 256×512, and FIG. 17 shows the number of frame-difference operations taken to reach the global minimum for the scaled image. By the timeslice shown in FIG. 17, on average it only takes 8 frame-difference operations to reach the global minimum for each video frame. More specifically, for almost half the number of frames, it takes no more than 5 frame-difference operations.

Figure 18:
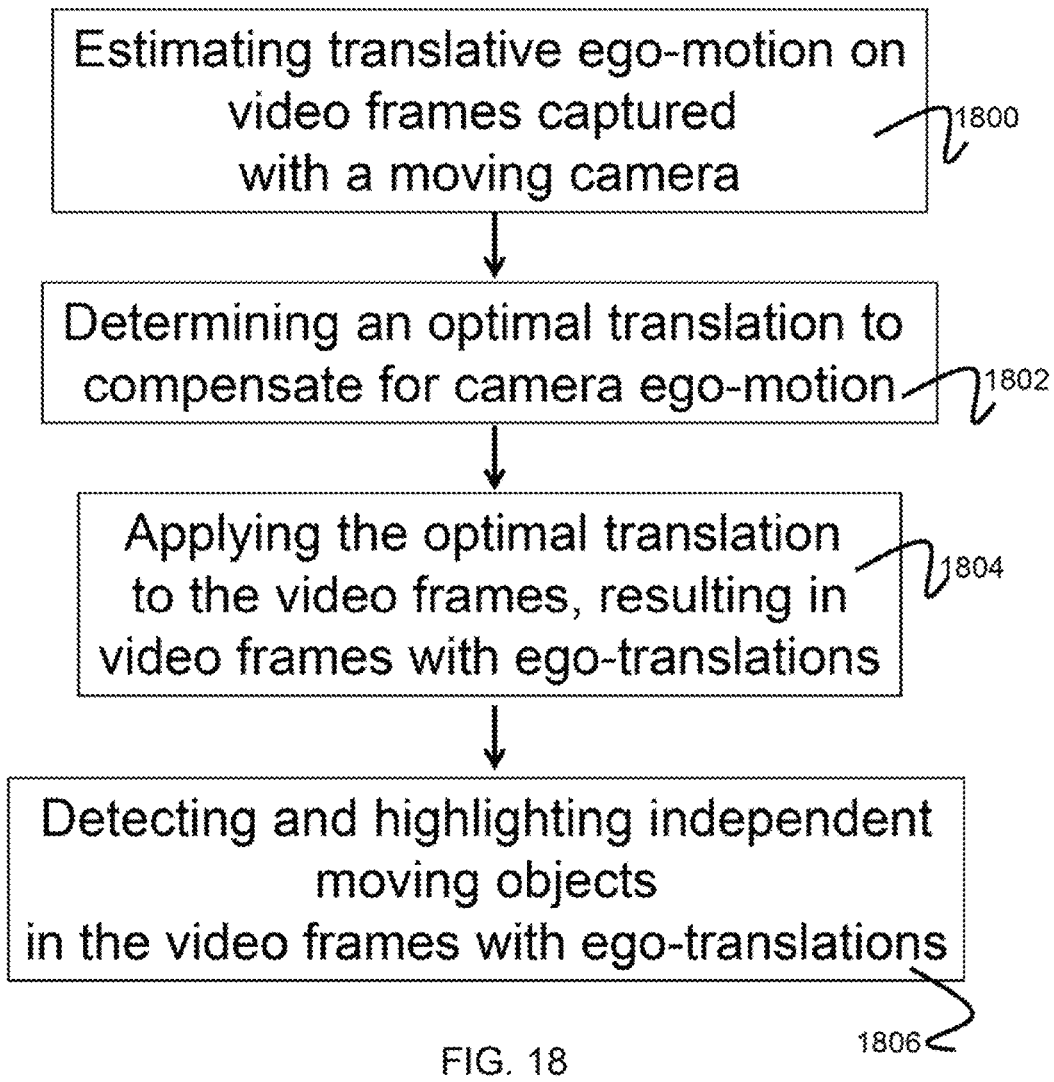
FIG. 18 is a flow diagram illustrating a system for estimating ego-translations in video captured with a moving camera according to various embodiments of the present disclosure.

FIG. 18 is a flow diagram illustrating a system for estimating ego-translations in video captured with a moving camera according to various embodiments of the present disclosure. As described above, in a first operation 1800, translative ego-motion on video frames captured by a moving camera is estimated. In a second operation 1802, an optimal translation is determined to compensate for camera motion. The optimal translation is applied to the video frames, resulting in video frames with ego-translations in a third operation 1804. In a fourth operation 1806, independent moving objects are detected and highlighted in the video frames with ego-translations. The highlighting may be adding a flag to the data describing the object or marking the image in some fashion to distinguish the moving object from the stationary background.

The present invention has a wide range of applications on image and video processing where the dominant ego-motion is translation, such as in helicopter, unmanned aerial vehicles (UAVs), and satellite videos. For instance, the system can be used for video surveillance, object tracking, and visual inspections.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for compensating ego-translations in video captured with a moving camera, the system comprising:
    a video camera, wherein the video camera comprises:
        one or more processors and a memory, the memory being a non-transitory computer-readable medium having executable instructions encoded thereon, such that upon execution of the instructions, the one or more processors perform operations of:
        estimating translative ego-motion on a sequence of image frames captured by a moving camera by minimizing a cost function that is based on at least one image frame difference, wherein I and I' represent consecutive image frames in the sequence of image frames, and wherein h and v represent shift translations, wherein an optimal translation (h, v) to compensate camera ego-motion is determined according to the following:

$$\min_{h,v} \sum_{i,j} |I'(i+h, j+v) - I(i, j)|,$$

where i and j represent coordinates of a position in an image frame;
    wherein an alternating one directional search is performed to minimize the cost function to find the optimal translations; and
    applying the optimal translations to the sequence of image frames, resulting in a sequence of image frames with ego-translations.

2. The system as set forth in claim 1, wherein the one or more processors further perform operations of:
    initiating a search for the optimal translation from an initial point;
    searching as far as possible in one of a horizontal or a vertical direction until reaching a point representing a local minimum for that direction;
    starting at the point representing the local minimum, searching as far as possible in the other of the horizontal or vertical direction; and
    alternating searching in the horizontal and vertical directions until a global minimum is reached, wherein the optimal translation is the global minimum.

3. The system as set forth in claim 2, wherein $(h_0, v_0)$ is the initial point, and wherein the one or more processors perform operations of:

(a) finding $h_1$ such that $$\min_{h} f(h, v_0) \text{ at } h = h_1;$$

(b) finding $v_1$ such that $$\min_{v} f(h_1, v) \text{ at } v = v_1;$$

(c) let $\Delta h = |h_1 - h_0|$, $\Delta v = |v_1 - v_0|$, then resetting $h_0 := h_1$ and $v_0 := v_1$, where $:=$ denotes "is defined as";

(d) repeating operations (a)-(c) until $\Delta h$ and $\Delta v$ are predetermined values.

4. The system as set forth in claim 2, wherein the optimal translation found in a current image frame is used as the initial point for a next image frame in the sequence of image frames to increase a search speed in finding the optimal translation in the next image frame.

5. The system as set forth in claim 1, wherein the one or more processors further perform an operation of detecting and highlighting independent moving objects in the sequence of image frames with ego-translations.

6. The system as set forth in claim 5, wherein the independent moving objects are detected by multiplying two consecutive image frame differences d1 and d2, wherein I1, I2, I3 are three consecutive image frames in the sequence of image frames, and (h1, v1) and (h2, v2) are corresponding optimal translations to compensate the camera ego-motion, wherein $$d1(i,j) = |I1(i,j) - I2(i+h1, j+v1)| \text{ and}$$

$$d2(i,j) = |I2(i,j) - I3(i+h2, j+v2)|,$$

wherein pixels for independent-moving objects are determined according to the following:

$$m(i,j) = d1(i,j) d2(i+h1, j+v1),$$

where m is an image map of detected object pixels, and (i, j) is a position in the image map.

7. The system as set forth in claim 5, wherein independent moving objects are detected by multiplying image frame differences from non-adjacent image frames.

8. A computer implemented method for compensating ego-translations in video captured with a moving camera, the method comprising an act of:

causing one or more processors to execute instructions encoded on a non-transitory computer-readable medium, such that upon execution, the one or more processors perform operations of:

estimating translative ego-motion on a sequence of image frames captured by a moving camera by minimizing a cost function that is based on at least one image frame difference, wherein I and I' represent consecutive image frames in the sequence of image frames, and wherein h and v represent shift translations, wherein an optimal translation (h, v) to compensate camera ego-motion is determined according to the following:

$$\min_{h,v} \sum_{i,j} |I'(i+h, j+v) - I(i,j)|,$$

where i and j represent coordinates of a position in an image frame;

wherein an alternating one directional search is performed to minimize the cost function to find the optimal translation; and applying the optimal translation to the sequence of image frames, resulting in a sequence of image frames with ego-translations.

9. The method as set forth in claim 8, wherein the one or more processors further perform operations of:

initiating a search for the optimal translation from an initial point;

searching as far as possible in one of a horizontal or a vertical direction until reaching a point representing a local minimum for that direction;

starting at the point representing the local minimum, searching as far as possible in the other of the horizontal or vertical direction; and alternating searching in the horizontal and vertical directions until a global minimum is reached, wherein the optimal translation is the global minimum.

10. The method as set forth in claim 9, wherein $(h_0, v_0)$ is the initial point, and wherein the one or more processors perform operations of:

(a) finding $h_1$ such that $$\min_{h} f(h, v_0) \text{ at } h = h_1;$$

(b) finding $v_1$ such that $$\min_{v} f(h_1, v) \text{ at } v = v_1;$$

(c) let $\Delta h = |h_1 - h_0|$, $\Delta v = |v_1 - v_0|$, then resetting $h_0 := h_1$ and $v_0 := v_1$, where $:=$ denotes "is defined as";

(d) repeating operations (a)-(c) until $\Delta h$ and $\Delta v$ are predetermined values.

11. The method as set forth in claim 9, wherein the optimal translation found in a current image frame is used as the initial point for a next image frame in the sequence of image frames to increase a search speed in finding the optimal translation in the next image frame.

12. The method as set forth in claim 8, wherein the one or more processors further perform an operation of detecting and highlighting independent moving objects in the sequence of image frames with ego-translations.

13. The method as set forth in claim 12, wherein the independent moving objects are detected by multiplying two consecutive image frame differences d1 and d2, wherein I1, I2, I3 are three consecutive image frames in the sequence of image frames, and (h1, v1) and (h2, v2) are corresponding optimal translations to compensate the camera ego-motion, wherein $$d1(i,j)=|I1(i,j)-I2(i+h1,j+v1)| \text{ and}$$

$$d2(i,j)=|I2(i,j)-I3(i+h2,j+v2)|,$$

wherein pixels for independent-moving objects are determined according to the following:

$$m(i,j)=d1(i,j)d2(i+h1,j+v1),$$

where m is an image map of detected object pixels, and (i,j) is a position in the image map.

14. The method as set forth in claim 12, wherein independent moving objects are detected by multiplying image frame differences from non-adjacent image frames.

15. A computer program product for compensating ego-translations in video captured with a moving camera, the computer program product comprising:
a non-transitory computer-readable medium having executable instructions encoded thereon, such that upon execution of the instructions by one or more processors, the one or more processors perform operations of:
estimating translative ego-motion on a sequence of image frames captured by a moving camera by minimizing a cost function that is based on at least one image frame difference, wherein I and I' represent consecutive image frames in the sequence of image frames, and wherein h and v represent shift translations, wherein an optimal translation (h, v) to compensate camera ego-motion is determined according to the following:

$$\min_{h,v} \sum_{i,j} |I'(i+h, j+v) - I(i, j)|,$$

where i and j represent coordinates of a position in an image frame;
wherein an alternating one directional search is performed to minimize the cost function to find the optimal translation; and
applying the optimal translation to the sequence of image frames, resulting in a sequence of image frames with ego-translations.

16. The computer program product as set forth in claim 15, further comprising instructions for causing the one or more processors to further perform operations of:
initiating a search for the optimal translation from an initial point;
searching as far as possible in one of a horizontal or a vertical direction until reaching a point representing a local minimum for that direction;
starting at the point representing the local minimum, searching as far as possible in the other of the horizontal or vertical direction; and
alternating searching in the horizontal and vertical directions until a global minimum is reached, wherein the optimal translation is the global minimum.

17. The computer program product as set forth in claim 16, wherein $(h_0, v_0)$ is the initial point, and wherein the computer program product further comprises instructions for causing the one or more processors to perform operations of:
(a) finding $h_1$ such that $$\min_h f(h,v_0) \text{ at } h=h_1;$$

(b) finding $v_1$ such that $$\min_v f(h_1,v) \text{ at } v=v_1;$$

(c) let $\Delta h=|h_1-h_0|$, $\Delta v=|v_1-v_0|$, then resetting $h_0:=h_1$ and $v_0:=v_1$, where := denotes "is defined as";
(d) repeating operations (a)-(c) until $\Delta h$ and $\Delta v$ are predetermined values.

18. The computer program product as set forth in claim 16, wherein the optimal translation found in a current image frame is used as the initial point for a next image frame in the sequence of image frames to increase a search speed in finding the optimal translation in the next image frame.

19. The computer program product as set forth in claim 15, further comprising instructions for causing the one or more processors to perform an operation of detecting and highlighting independent moving objects in the sequence of image frames with ego-translations.

20. The computer program product as set forth in claim 19, wherein the independent moving objects are detected by multiplying two consecutive image frame differences d1 and d2, wherein I1, I2, I3 are three consecutive image frames in the sequence of image frames, and (h1, v1) and (h2, v2) are corresponding optimal translations to compensate the camera ego-motion, wherein $$d1(i,j)=|I1(i,j)-I2(i+h1,j+v1)| \text{ and}$$

$$d2(i,j)=|I2(i,j)-I3(i+h2,j+v2)|,$$

wherein pixels for independent-moving objects are determined according to the following:

$$m(i,j)=d1(i,j)d2(i+h1,j+v1),$$

where m is an image map of detected object pixels, and (i,j) is a position in the image map.

21. The computer program product as set forth in claim 19, wherein independent moving objects are detected by multiplying image frame differences from non-adjacent image frames.

* * * * *